US007069360B2

(12) United States Patent  
Thurlo et al.

(10) Patent No.: US 7,069,360 B2  
(45) Date of Patent: Jun. 27, 2006

(54) METHOD AND APPARATUS FOR DETECTING A DEVICE'S ABILITY TO RUN AT A SELECTED FREQUENCY IN A PCI NON-INHIBIT BUS-CONNECT MODE

(75) Inventors: Clark S. Thurlo, Folsom, CA (US); Lorenza L. Hawthorne, III, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 10/232,125

(22) Filed: Aug. 30, 2002

(65) Prior Publication Data

US 2004/0044817 A1   Mar. 4, 2004

(51) Int. Cl.  
*G06F 13/14* (2006.01)

(52) U.S. Cl. .................. 710/104; 710/16; 710/301; 710/302; 713/300

(58) Field of Classification Search ............... 710/305, 710/302, 306, 300, 301, 304; 713/322, 500–501, 713/503, 600–601  
See application file for complete search history.

(56) References Cited

U.S. PATENT DOCUMENTS

| | | | | |
|---|---|---|---|---|
| 5,875,310 A * | 2/1999 | Buckland et al. | ........... | 710/309 |
| 5,943,482 A * | 8/1999 | Culley et al. | ............... | 710/302 |
| 6,055,596 A * | 4/2000 | Cepulis | ....................... | 710/104 |
| 6,070,207 A * | 5/2000 | Bell | ........................... | 710/302 |
| 6,073,196 A * | 6/2000 | Goodrum et al. | ........... | 710/302 |
| 6,134,621 A * | 10/2000 | Kelley et al. | ............... | 710/311 |
| 6,185,642 B1 * | 2/2001 | Beukema et al. | ............. | 710/60 |
| 6,189,058 B1 * | 2/2001 | Jones et al. | .................. | 710/302 |
| 6,295,568 B1 * | 9/2001 | Kelley et al. | ............... | 710/305 |
| 6,484,222 B1 * | 11/2002 | Olson et al. | ................. | 710/300 |
| 6,510,473 B1 * | 1/2003 | Voit | ........................... | 710/58 |
| 6,557,068 B1 * | 4/2003 | Riley et al. | ................. | 710/306 |
| 6,594,771 B1 * | 7/2003 | Koerber et al. | ............. | 713/330 |
| 6,754,758 B1 * | 6/2004 | Addy | ......................... | 710/301 |
| 6,772,263 B1 * | 8/2004 | Arramreddy | ................ | 710/302 |
| 2002/0002651 A1 * | 1/2002 | MacLaren et al. | .......... | 711/102 |

OTHER PUBLICATIONS

Yamada, T., et al., "Experimental Research on a Hot-Swappable Bus System," Jun. 1997, Proceedings of the 1997 American Control Conference, vol. 1, 4-6, p. 213-217.*

* cited by examiner

*Primary Examiner*—Glenn A. Auve  
(74) *Attorney, Agent, or Firm*—Sharon Wong

(57) ABSTRACT

Embodiments of the present invention detect a device's ability to run at a particular frequency on a PCI bus operating in a non-inhibit bus mode. In one embodiment, expansion slots are powered on, connected to the PCI bus and reset. The expansion slots are then disconnected from the PCI bus while power is applied. A frequency detection algorithm, which is operable regardless of the inhibit bus connect setting or capability, is executed. The expansion slots are then reconnected to the PCI bus.

29 Claims, 4 Drawing Sheets

METHOD AND APPARATUS FOR DETECTING A DEVICE'S ABILITY TO RUN AT A SELECTED FREQUENCY IN A PCI NON-INHIBIT BUS-CONNECT MODE

BACKGROUND

Background Information

Many existing computer systems include I/O devices such as PCI compatible devices or PCI expansion cards that can be connected to one of several PCI expansion slots. In computer systems utilizing a PCI bus, PCI expansion cards can be unplugged from and plugged into PCI expansion slots while the computer system is powered and running. This is called hot plugging. The ability to hot plug PCI cards and adapters is desirable because PCI expansion cards can be replaced without having to power down the computer system. Maintenance can be performed on a server in a network without powering down the computer system thereby allowing use of the computer system during the maintenance period.

In a typical implementation, the host chipset is a PCI bus controller, 64 bits capable of PCI or PCI-x modes that are industry standard modes. The chipset includes a hot plug controller which allows PCI cards to be pulled in and out of slots while the system is running. With this controller and through industry standards, cards can be run at a number of different frequencies. PCI cards could run at 33 MHz or 66 MHz. PCI-x could run at 66 MHz, 100 MHz, or 133 MHz.

In an inhibit bus connect mode, the expansion slots are powered but not connected to the PCI bus and frequency capability signals read but not Added together thus eliminating issues associated with empty slots. However, absent activation or presence of an inhibit bus connect mode (i.e. non-inhibit bus mode), the expansion slots are powered and connected to the PCI bus, and frequency capability signals read and added together, thus introducing a problem for the firmware's Basic Input/Output System (IOS) frequency detection algorithm when empty expansion slots are present. If any expansion slots are empty of devices, that expansion slot shows up as incapable of running any frequency, thus rendering frequency detection inaccurate.

DETAILED DESCRIPTION

Figure 1:
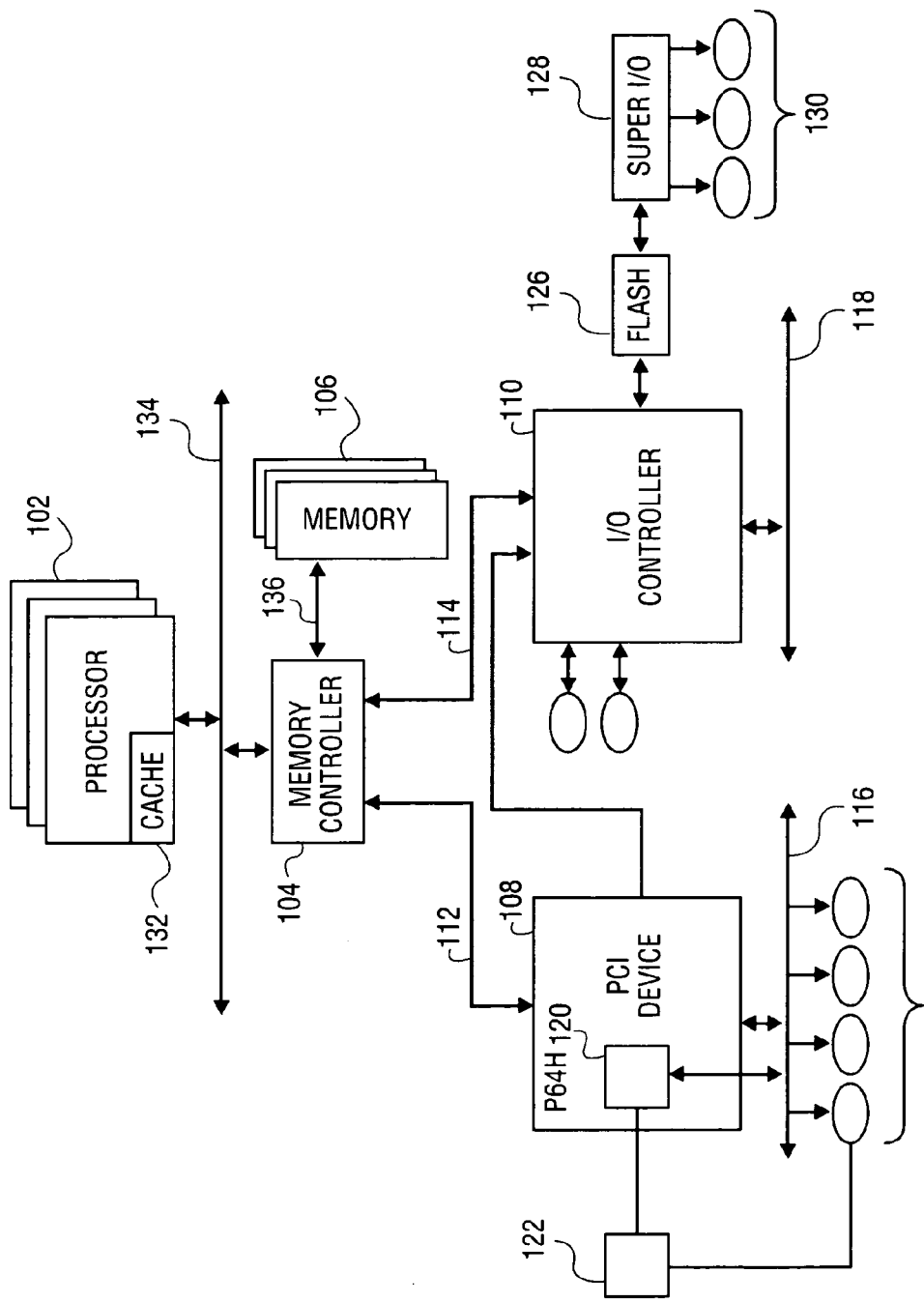
FIG. 1 illustrates a block diagram of an embodiment of a computer system according to the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

Embodiments of the present invention detect a device's ability to run at a particular frequency, such as 66 MHz, on a PCI bus operating in a non-inhibit bus mode. In one embodiment, expansion slots are powered on, connected to the PCI bus and reset. The expansion slots are then disconnected from the PCI bus while power is applied. A frequency detection algorithm, which is operable regardless of the inhibit bus connect setting or capability, is executed. The expansion slots are then reconnected to the PCI bus.

In the following discussion, like reference numerals and characters may be used to designate identical, corresponding or similar components in differing figure drawings. Further, in the detailed description to follow, example sizes/models/values/ranges may be given although the present invention is not limited to the same. Arrangements may be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art. Where specific details (e.g., circuits, flowcharts) are set forth in order to describe example embodiments of the invention, it should be appreciated to one skilled in the art that the invention can be practiced without, or with variation of, these specific details. Finally, it should be appreciated that differing combinations of hard-wired circuitry and software instructions may be used to implement embodiments of the present invention. That is, the present invention is not limited to any specific combination of hardware and software.

Embodiments of the present invention may also be described with respect to a signal line, a plurality of signal lines, a signal and a plurality of signals. These terminologies are intended to be interchangeable. That is, an embodiment may be described with respect to a signal line that couples two components. This embodiment likewise includes plural signal lines to couple the two components.

Additionally, any reference in the specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

For illustrative purposes, prior art references and preferred embodiments of the present invention are described hereinafter for computer systems utilizing the Intel x86 microprocessor architecture and certain terms and references will be specific to that processor platform. PCI and PCI-X are interface standards, however, that are hardware independent and may be utilized with any host computer designed for these interface standards. It will be appreciated by those skilled in the art of computer systems that the present invention may be adapted and applied to any computer platform utilizing the PCI and PCI-X interface standards including those systems utilizing the Windows, UNIX, OS/2 and Linux operating systems.

FIG. 1 illustrates a block diagram of an embodiment of a computer system 100 according to the present invention. Other embodiments and configurations are also within the scope of the present invention. Computer system 100 may include processor 102, memory controller 104, memory 106, and one or more host devices 108–110 coupled to memory controller 104 by buses 112 and 114 for providing an interface with peripheral buses such as PCI buses 116 and 118 of different bandwidths and operating speeds.

Host devices 108 and 110 may be similar to PCI bridges (e.g., host, PCI—PCI, or standard expansion bridges) in the form of PCI chips. In particular, devices 108 and 110 may correspond to a PCI compatible device 108 (for example, P64H or P64H2 64 bit chipset) and an input/output controller 110. Embodiments of the present invention may include a control unit 120 (also called a control mechanism) as part of the chipset or P64H2 108. Control unit 120 may be coupled to hot plug controller deserializer 122. Hot plug controller deserializer 122 may be further coupled to I/O devices 124. A plurality of I/O devices 124 may be provided along PCI bus 116.

Computer system 100 includes flash memory 126, I/O 128 coupled to I/O controller 110 for providing an interface with a plurality of I/O devices 180. I/O devices can include, but are not limited to, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. Computer system 100 may be configured differently or employ some or different components than those shown in FIG. 1.

Processor 102 may include a plurality of host processors and cache 132. Memory controller 104 is coupled to processor 102 by bus 134 (i.e., host or processor bus) and is coupled to memory 106 by bus 136. Memory 106 may be a dynamic random-access-memory (DRAM), or may be a read-only-memory (ROM), video random-access-memory (VRAM) and the like. Memory 106 stores information and instructions for use by the host processors.

PCI compatible device, for example P64H2, 108 and I/O controller 110 may be coupled to memory controller 104 by buses 112 and 114, and may operate as an interface between bus 134 and peripheral buses 116 and 118 such as PCI buses of different bandwidths and operating speeds. PCI buses 116 and 118 may be high performance 32 or 64 bit synchronous buses with automatic configurability and multiplexed address, control and data lines as described in the latest version of the PCI specification. For example, the PCI bus 116 of 64-bits and 66 MHz may connect to PCI compatible device 440 108. Similarly, the PCI bus 118 of 32-bits and 33 MHz may connect to I/O controller 110. Other types of bus architectures such as Industry Standard Architecture (ISA) and Expanded Industry Standard Architecture (EISA) buses may also be utilized.

Buses 112 and 114, coupling PCI compatible device 108 and I/O controller 110 to memory controller 104, are primary PCI buses of different bandwidths and operating speeds. Peripheral buses 116 and 118 that connect P64H2 108 and I/O controller 110 to I/O devices may be secondary PCI buses of different bandwidths and operating speeds. PCI compatible device 108 and I/O controller 110 may correspond to PCI-PCI bridges designed for compliance with the "PCI Local Bus Specification, Revision 2.2" set forth by the PCI Special Interest Group (SIG) on Dec. 18, 1998 or later revisions (hereinafter, "PCI specification"), and includes extensions to the PCI bus such as the PCI-X bus, and the "PCI Bus Power Interface (ACPI) and Power Management Interface Specification, Revision 1.1" set forth by the PCI Special Interest Group (SIG) on Jun. 30, 1997 or later revisions. P64H2 may correspond to "P64H2 Component Specification, Revision 2.0, Ref. No. FM2048."

PCI bus refers to a data communication bus that conforms to the PCI specification, and includes extensions to the PCI bus such as the PCI-X bus. The invention is not limited in scope to complying with the PCI specification. The PCI bus was developed to have sufficient data bandwidth for high performance peripherals such as a video controller, a high speed network interface card(s), a hard disk controller(s), a SCSI adapter, a wide area network digital router, and the like. Registered PCI ("PCI-X") buses are comprised of a registered peripheral component interconnect bus, and associated logic circuits and signal protocols. According to the PCI-X specification, signals are sampled on the rising edge of the PCI bus clock and the registered version of these signals are used inside the PCI-X devices. PCI-to-PCI bus bridges provide enough PCI device card slots for a typical computer system such as a network server or graphics workstation. PCI-to-PCI bus bridges create new PCI bus numbers and introduce increasingly complex data protocol and handshake requirements, multiple delayed transactions, additional bus latency, and potential deadlock cycles.

PCI compatible device 108 allows the PCI hot plug to be configured at power up as either a parallel hot plug system or a serial hot plug system based on input strap signals. For example, if there are three to six hot plug slots (represented by the devices 124 in FIG. 1), then PCI compatible device may 108 power up in the serial mode. On the other hand, if there are one or two slots, PCI compatible device 108 may power up in the parallel mode.

In accordance with embodiments of the present invention, control unit 120 is capable of detecting the frequency of one or more devices connected to expansion slots associated with a PCI bus. More specifically, control unit 120 includes control logic. In particular, control logic determines the frequency of one or more devices connected to expansion slots associated with a PCI bus. Other configurations and embodiments of control unit 120 are also within the scope of the present invention.

Figure 2:
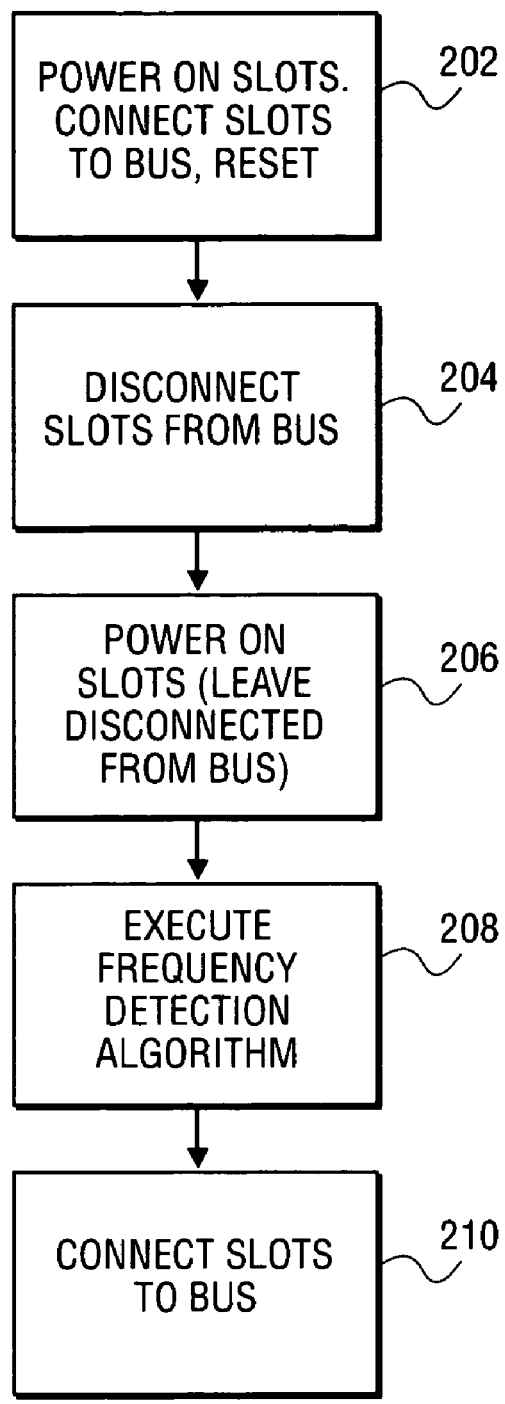
FIG. 2 is a flow chart illustrating an embodiment of a routine to detect a device's ability to run at a selected frequency in a PCI non-inhibit bus connect mode.

FIG. 2 is a flow chart illustrating an embodiment of a routine to detect a device's ability to run at a selected frequency in a PCI non-inhibit bus connect mode. As previously noted, PCI compatible device, such as P64H2, may feature an inhibit bus connect mode. In this mode, the slots will be powered up but not connected to the bus. Thus, there is no issue with slots not being connected to the bus. When running in the non-inhibit bus connect mode, though, the slots will be connected to the bus, introducing a problem for the firmware's (BIOS's) frequency detection algorithm. Embodiments of the present invention provide for a routine to detect a device's ability to run at a selected frequency in a PCI non-inhibit bus connect mode.

In particular, in step 202, a power fault enable bit is set, which powers on the slots, connects them to the bus and resets the devices.

In step 204, the slot enable bits for those slots are cleared, which disconnects them from the bus.

In step 206, the slot power enable bits for those slots are set, powering them on but leaving the slots disconnected from the bus.

In step 208, a frequency detection algorithm, such as that illustrated in FIG. 5 and discussed in detail below, is executed. The frequency detection algorithm will work regardless of the inhibit bus connect setting.

In step 210, the slot enable bits (cleared in step 204) are set, connecting the slots to the bus.

Figure 3:
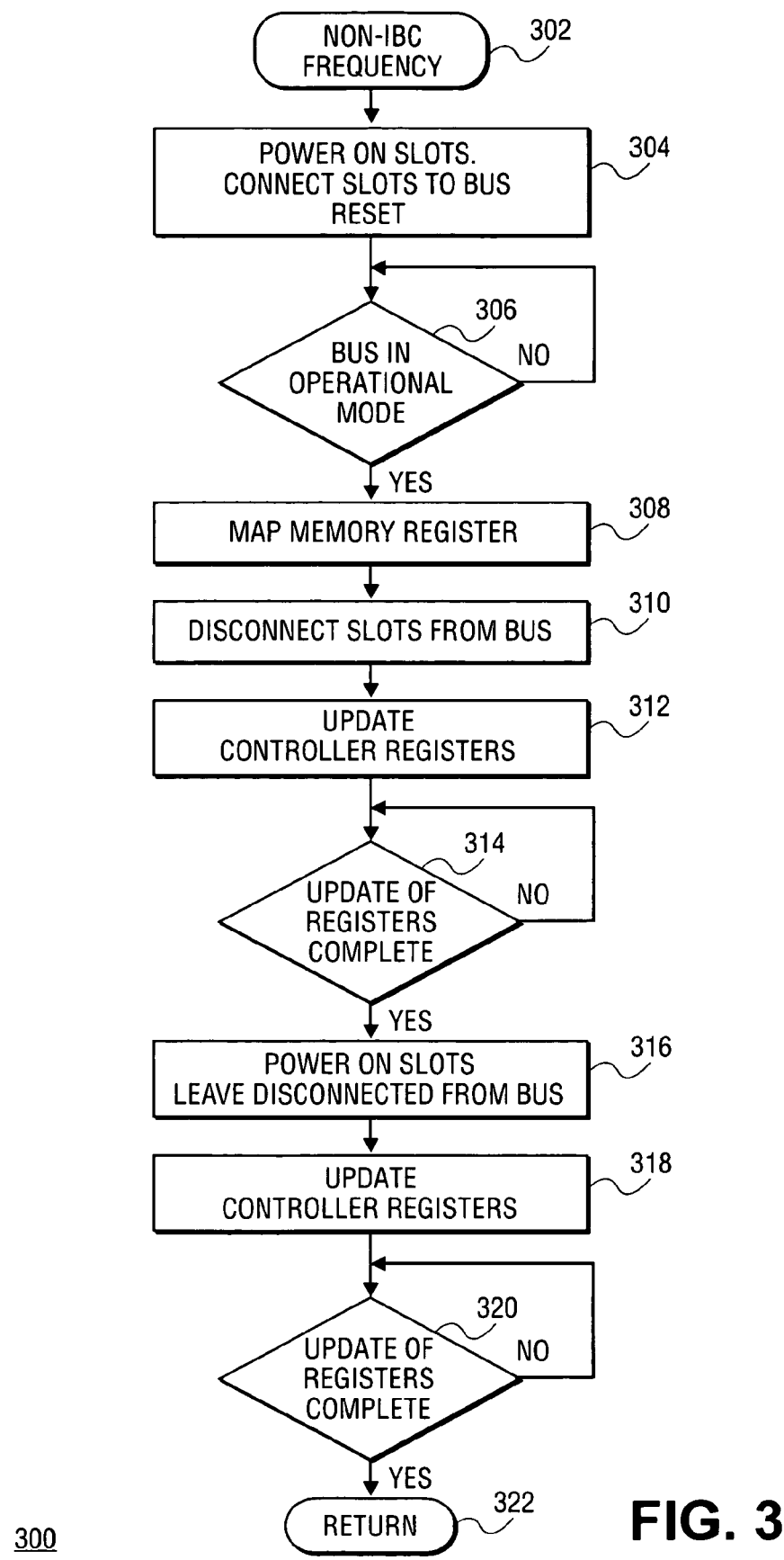
FIG. 3 is a flow chart illustrating an embodiment of a routine to configure a PCI bus and expansion slots.

FIG. 3 is a flow chart 300 illustrating an embodiment of a routine to configure a PCI bus and expansion slots for detection of a device's ability to run at a predefined frequency in a non-inhibit bus connect frequency mode.

At step 302, processor, operating under BIOS control, determines whether the controller is in a non-inhibit bus connect frequency mode after system reset. The non-inhibit bus connect frequency mode may occur in various ways, including but not limited to, the feature not being present in the controller or not functioning properly. In a typical implementation, the processor, under BIOS control, reads the controller's configuration register to determine whether the PCI buses have been configured in a non-inhibit bus frequency mode.

Each bus includes a plurality of PCI expansion slots in which a PCI expansion card or device can be plugged in. At step 304, power is applied to the bus system and the bus system placed in an operational mode. This powers the bus and expansion slots. In a typical implementation, to power the bus and expansion slots, a power enable bit is set, for example, hot plug controller bit is set. Placing the bus system in an operational mode can include for example, enabling the bus drivers in the controller and the bus expander bridge (or in the graphics expander bridge) and ensuring that bus activity for the new bus system is not quiesced. The bus expander bridge is not in a reset mode when it is operational, and host processor can confirm this by de-asserting a reset bit or pin on the bus expander bridge.

PCI includes bus and power switches for each expansion slot to isolate and power up and down an individual slot. The system of the present invention does not need to individually isolate each expansion slot (e.g., slots) because the entire bus system (e.g., bus card, including bus expander bridge, PCI buses and PCI expansion slots) can be quiesced and disconnected as a unit from the computer system.

In step 306, the controller determines if the bus system is in an operational mode (i.e. powered up). In a typical implementation, a check on/off busy protocol is executed. Other techniques can be used to confirm that the bus system is in a proper powered up operational mode. At step 306, if the bridge of the bus system is an operational mode, the flow of FIG. 3 proceeds to step 308.

At step 308, once controller determines bus system is in an operational mode (i.e. powered up) (step 306), controller maps the slot disable instructions into a slot disable register from which the instruction will be executed by processor. In a typical implementation, P64H2 controller maps the expansion slot disable instructions into a memory register 01 from which the instruction will be executed by processor.

In step 310, the slots are disconnected from the bus. This allows the frequency capability of the slots to be read while they are disconnected. In a typical implementation, the register associated with the slot enable function is set.

In step 312, an indicator to update the controller registers is set. In a typical implementation, the SOGO bit, as defined in the P6H2 Component Specification, Rev. 2.0, Ref. No. FM 2048), is set. In particular, the values in certain hot plug controller registers will be sent out to the serial inputs when the SOGO bit is set. Then the BIOS polls the SOGO bit until it clears, indicating the asynchronous event has completed. The register list includes, but is not limited to, the slot enable and slot power enable registers that are updated.

The serial outputs are updated until there is indication that the asynchronous event has completed (step 314). In a typical implementation, clearing of the SOGO bit indicates that the updating has concluded.

Steps 316 to 320 are then executed for register 2Dh. In particular, in step 316, the slots are powered up and left disconnected from the bus. Similar to steps 312 and 314, in steps 318 and 320, an indicator to update the controller registers is set. In a typical implementation, the SOGO bit is set. In particular, the values in certain hot plug controller registers will be sent out to the serial inputs when the SOGO bit is set. Then the BIOS polls the SOGO bit until it clears, indicating the asynchronous event has completed. The register list includes, but is not limited to, the slot enable and slot power enable registers that are updated. The serial outputs are updated until there is indication that the asynchronous event has completed (step 320). In a typical implementation, clearing of the SOGO bit indicates that the updating has concluded.

Figure 4:
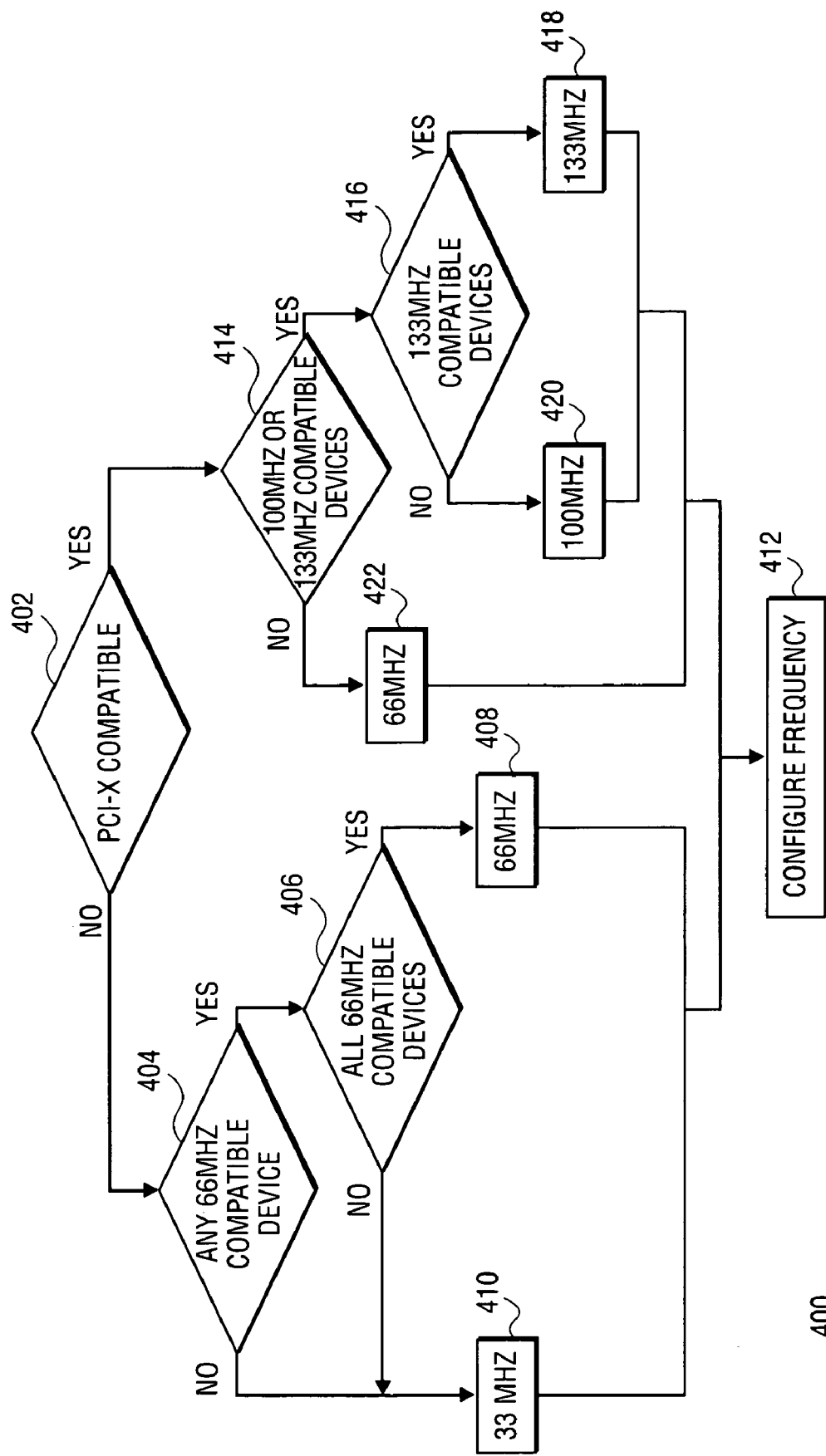
FIG. 4 is a flow chart illustrating an embodiment of a routine to detect a PCI device's ability to run at a predefined frequency once the PCI bus and expansion slots are configured.

FIG. 4 is a flow chart 400 illustrating an embodiment of a routine to detect a device's ability to run at a predefined frequency on a PCI bus. For illustrative purposes, the invention is used to detect a device's ability to run at 66 MHz on a PCI bus although one skilled in the art will recognize that the present invention is not limited to such 66 MHz.

In step 402, the control logic determines whether PCI or non-PCI-X compatible devices are present. In a typical implementation, this can be determined by whether the hot plug controller register is set to a certain state.

In step 404, if PCI compatible devices are present, the control logic determines if there are any 66 MHz compatible devices (e.g. cards) plugged in the expansion slots. In a typical implementation, this is determined by looking at the hot plug controller's memory register 14 of the P64H2.

In step 406, the control logic determines whether all of the devices plugged in are 66 MHz compatible. If so, the devices will operate at 66 MHz (step 408). In a typical implementation, the speed of operation of each PCI I/O device may be determined by reading the 66 MHz-CAPABLE bit in the status register, and/or by a hardwired electrical signal "M66EN" as an active "high" input to the 66 MHz PCI device card. The frequency capability bits of the devices are then ANDed together to determine whether all of the devices plugged in are 66 MHz compatible.

If one or more of the devices are not 66 MHz compatible (e.g. one device is only 33 MHz compatible), the devices will operate at the lower speed of 33 MHz (step 410).

In step 412, the devices are configured to run at the frequency determined in the previous steps.

In step 402, if the hot plug control logic determines PCI-X compatible devices are present, the frequency of operation will be determined and configured. In the PCI-X configuration, only those slots that are occupied are ANDed together. Thus if all the cards plugged in are PCI-x compatible, their capability bits are ANDed and routed to the hot plug controller register. In a typical implementation, the information is routed to register 47[5].

In step 414, it is determined whether the devices are 100 MHz or 133 MHz compatible. In a typical implementation, the speed of operation of each device is determined by reading a bit in the status register.

If the devices are not 100 MHz or 133 MHz compatible, the control logic relays to the controller that the devices are 66 MHz compatible (step 422). The cards are then all configured to run at 66 MHz (step 412).

If in step 414, control logic determines the cards are 100 MHz or 133 MHz compatible, the control logic next determines whether the cards are 133 MHz compatible (step 416). In a typical implementation, the speed of operation of each device may be determined by reading a bit in the status register, for example, P2P 44[0]=1.

If so, the control logic relays to the controller that the devices are 133 MHz compatible (step 418). The cards are then all configured to run at 133 MHz (step 412).

If the control logic determines that the cards are not 133 MHz, but rather 100 MHz compatible (step 416), the control logic relays to the controller that the devices are 100 MHz compatible (step 420). The cards are then configured to run at 100 MHz (step 412).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of detecting the frequency of one or more devices connected to expansion slots associated with a Peripheral Component Interconnect (PCI) bus, comprising:
    powering on the expansion slots;
    connecting the expansion slots to the PCI bus;
    disconnecting the expansion slots from the PCI bus while power is applied to the expansion slots;
    detecting the speed of operation each device connected to one of the expansion slots; and
    reconnecting the expansion slots to the PCI bus.

2. The method claimed in claim 1 wherein the PCI bus operates in a non-inhibit bus connect mode.

3. The method claimed in claim 1, wherein powering on the expansion slots further comprises:
    setting a power fault enable signal to power on the expansion slots.

4. The method claimed in claim 3, wherein setting a power fault enable signal to power on the expansion slots further comprises:
    resetting the devices.

5. The method claimed in claim 1, wherein disconnecting the expansion slots from the PCI bus while power is applied further comprises:
    clearing an enable signal for each expansion slot.

6. The method claimed in claim 1, wherein detecting the speed of operation each device connected to an expansion slot further comprises:
    executing a frequency detection algorithm.

7. The method claimed in claim 1, wherein reconnecting the expansion slots to the PCI bus further comprises:
    setting enable bits associated with each expansion slot.

8. The method claimed in claim 1, wherein detecting the speed of operation each device connected to an expansion slot is capable of further comprises:
    detecting each device's ability to operate at a first speed.

9. The method claimed in claim 8, wherein detecting each device's ability to operate at a first speed further comprises:
    detecting each device's ability to operate at 66 MHz.

10. The method claimed in claim 9, wherein detecting the speed of operation each device connected to an expansion slot is capable of further comprises:
    configuring the devices to run at first speed when each device is capable of operating at the first speed.

11. The method claimed in claim 9, wherein detecting the speed of operation each device connected to an expansion slot is capable of further comprises:
    configuring the devices to run at a speed lower than the first speed when at least one of the devices is not capable of operating at the first speed.

12. The method claimed in claim 1, wherein detecting the speed of operation each device connected to an expansion slot is capable of further comprises:
    determining whether PCI or non-Peripheral Component Interconnect Extended (PCI-X) compatible devices are present.

13. The method claimed in claim 12, wherein detecting the speed of operation each device connected to an expansion slot is capable of further comprises:
    determining whether each PCI compatible device is 66 MHz capable.

14. The method claimed in claim 12, wherein detecting the speed of operation each device connected to an expansion slot is capable of further comprises:
    reading the 66 MHz capable bit in a status register.

15. The method claimed in claim 12, wherein detecting the speed of operation each device connected to an expansion slot is capable of further comprises:
    detecting a speed of operation signal.

16. A machine-readable medium having stored therein a plurality of machine-readable instructions executable by a processor to detect the frequency of one or more devices connected to expansion slots associated with a Peripheral Component Interconnect (PCI) bus, comprising:
    instructions to power on the expansion slots;
    instructions to connect the expansion slots to the PCI bus
    instructions to disconnect the expansion slots from the PCI bus while power is applied to the expansion slots;
    instructions to detect the speed of operation each device connected to one of the expansion slots; and
    instructions to reconnect the expansion slots to the PCI bus.

17. The machine-readable medium claimed in claim 16, wherein the PCI bus operates in a non-inhibit bus connect mode.

18. The machine-readable medium claimed in claim 16, wherein instructions to detect the speed of operation each device connected to an expansion slot further comprises:
    instructions to execute a frequency detection algorithm.

19. The machine-readable medium claimed in claim 16, wherein instructions to detect the speed of operation each device connected to an expansion slot is capable of further comprises:
    instructions to detect each device's ability to operate at a first speed.

20. The machine-readable medium claimed in claim 19, wherein instructions to detect each device's ability to operate at a first speed further comprises:
    instructions to detect each device's ability to operate at 66 MHz.

21. The machine-readable medium claimed in claim 16, wherein instructions to detect the speed of operation each device connected to an expansion slot is capable of further comprises:
    instructions to determine whether PCI or non- Peripheral Component Interconnect Extended (PCI-X) compatible devices are present.

22. The machine-readable medium in claim 21, wherein instructions to detect the speed of operation each device connected to an expansion slot is capable of further comprises:
   instructions to determine whether each PCI compatible device is 66 MHz capable.

23. The machine-readable medium claimed in claim 22, wherein instructions to detect the speed of operation each device connected to an expansion slot is capable of further comprises:
   instructions to read the 66 MHz-CAPABLE bit in a status register.

24. The machine-readable medium claimed in claim 22, wherein instructions to detect the speed of operation each device connected to an expansion slot is capable of further comprises:
   instructions to detect a speed of operation signal.

25. The machine-readable medium claimed in claim 22, wherein instructions to detect the speed of operation each device connected to an expansion slot is capable of further comprises:
   instructions to configure the devices to run at first speed when each device is capable of operating at the first speed.

26. The machine-readable medium claimed in claim 22, wherein instructions to detect the speed of operation each device connected to an expansion slot is capable of further comprises:
   instructions to configure the devices to run at a speed lower than the first speed when at least one of the devices is not capable of operating at the first speed.

27. A computer system, comprising:
   a host processor coupled to a host bus;
   a bridge controller coupled to the host bus; and
   a bus system that is hot plug connectable to the bridge controller, the bus system comprising:
   one or more buses coupled to the bus bridge, each bus including one or more expansion slots for receiving a device, wherein the controller powers on the expansion slots, disconnects the expansion slots from the bus while power is applied to the expansion slots, and detect the speed of operation each device connected to one of the expansion slots in a non-inhibit bus connect mode.

28. The bus system claimed in claim 27, where the buses comprise Peripheral Component Interconnect (PCI) buses.

29. A system, comprising:
   a bridge controller coupled to a host bus for receiving signals from a processor; and
   a bus system that is connectable to the bridge controller, the bus system comprising:
   one or more Peripheral Component Interconnect (PCI) buses coupled to the bus bridge, each bus including one or more expansion slots for receiving a device, wherein the controller powers on the expansion slots, disconnects the expansion slots from the bus while power is applied to the expansion slots to detect the speed of operation each device connected to one of the expansion slots in a non-inhibit bus connect mode.

* * * * *